United States Patent [19]

Nozawa et al.

[11] Patent Number: 4,550,378

[45] Date of Patent: Oct. 29, 1985

[54] METHOD OF NUMERICAL CONTROL AND DEVICE THEREFOR

[75] Inventors: Ryoichiro Nozawa, Tokyo; Tsuyoshi Nagamine, Hachioji; Atsushi Shima, Tokyo, all of Japan

[73] Assignee: Fanuc Ltd, Minamitsuru, Japan

[21] Appl. No.: 700,052

[22] Filed: Feb. 8, 1985

Related U.S. Application Data

[63] Continuation of Ser. No. 620,545, Jun. 18, 1984, abandoned, which is a continuation of Ser. No. 288,185, Jul. 29, 1981, abandoned.

[30] Foreign Application Priority Data

Aug. 1, 1980 [JP] Japan ............... 55-106025

[51] Int. Cl.$^4$ .............. G06F 15/46; G05B 23/02
[52] U.S. Cl. ................. 364/474; 318/565; 364/167; 364/184; 364/507
[58] Field of Search .......... 364/474, 475, 167–171, 364/507, 508, 511, 550, 551, 184–187; 408/6–11; 318/561, 565, 572; 73/104; 29/568

[56] References Cited

U.S. PATENT DOCUMENTS

| 3,576,540 | 4/1971 | Fair et al. | 364/474 |
| 4,176,396 | 11/1979 | Howatt | 364/551 |
| 4,220,995 | 9/1980 | Shoda | 364/511 X |
| 4,249,243 | 2/1981 | Yoshida et al. | 364/474 |
| 4,326,257 | 4/1982 | Sata et al. | 364/551 X |

FOREIGN PATENT DOCUMENTS 2642251 3/1978 Fed. Rep. of Germany.
2904080 8/1979 Fed. Rep. of Germany.

Primary Examiner—Joseph Ruggiero
Attorney, Agent, or Firm—Staas & Halsey

[57] ABSTRACT

A numerical control method, and a numerical control device for subjecting a workpiece to a predetermined machining operation on the basis of a machining program. When a specified signal is generated during a machining operation under the control of the machining program, a subprogram, to which the numerical control device responds to execute processing in accordance with the specified signal, is stored in memory beforehand. Machining in progress under the control of the machining program is interrupted temporarily by the generation of the specified signal. At the same time, the subprogram is read from memory and is utilized in the processing of predetermined process steps. Following such processing, machining under the control of the machining program is resumed from the point of interruption or from an earlier point.

10 Claims, 6 Drawing Figures

METHOD OF NUMERICAL CONTROL AND DEVICE THEREFOR

This is a continuation of co-pending application Ser. No. 620,545 filed on June 18, 1984 abandoned, which is a continuation of Ser. No. 288,185 filed July 29, 1981, abandoned.

BACKGROUND OF THE INVENTION

This invention relates to a method of numerical control, and to a numerical control device. More particularly, the invention relates to a numerical control method and to a numerical control device that enable a machining operation to be interrupted when a specified signal, such as an abnormality signal indicative of tool breakage or the like, is generated during the machining operation, and that enable numerical control processing to be executed in accordance with the specified signal so that machining can be resumed following such processing.

When an abnormality such as a broken tool develops during a machining operation being performed under the control of a machining program, the operator ordinarily halts the machining operation immediately, feeds the broken tool manually to a prescribed tool changing position without allowing the tool to contact the workpiece, and then changes the tool. Machining then resumes from the beginning of the machining program. Alternatively, the operator may reposition the new tool at the point where the original tool broke and then allow the machining operation to resume from that point. Since this procedure requires the intervention of human labor, a considerable amount of time elapses from the occurrence of the abnormality to the resumption of machining. The procedure is also complicated. Moreover, when an attempt is made to accomplish the foregoing automatically, a considerable amount of additional hardware must be provided.

Already known in the art is a numerical control device having an automatic tool change function, the device being adapted to transport a tool automatically to a tool change position, change the tool and then resume machining (as disclosed in, for example, Japanese patent application No. 48-86628 filed on Apr. 4, 1975 and the FANUC 200C operator's manual, on pages 59 to 63, published by FUJITSU FANUC, LTD., June 1980). However, the known numerical control device having the tool change function will not execute automatic tool change processing unless it is instructed to do so by the machining program. In other words, a tool change will not take place in the event of an unexpected event such as the breakage of a tool during machining.

BRIEF SUMMARY OF THE INVENTION

Accordingly, an object of the present invention is to provide a numerical control method and device wherein, if an event arises in a machine tool or numerical control device during machining under the control of a machining program, the machining operation is interrupted, processing in accordance with the abnormality is executed, and then, following such processing, the interrupted machining operation is resumed on the basis of the machining program.

Another object of the present invention is to provide a numerical control method and device wherein a tool can be changed and machining resumed automatically or with a minimum of operator intervention even if a tool breaks during machining.

Still another object of the present invention is to provide a numerical control method and device wherein an abnormality can be dealt with in a short period of time to enhance machining efficiency.

A further object of the present invention is to provide an numerical control method and device wherein the amount of additional hardware is minimal.

Other features and advantages of the invention will be apparent from the following description taken in connection with the accompanying drawings.

DESCRIPTION OF THE PREFERRED EMBODIMENT

Reference will first be had to FIGS. 1A through 1D which are useful in describing a numerical control method according to the present invention. B1, B2, B3 . . . represent tool paths which are instructed by the machining program, wherein B1 is the tool path specified by a first block of machining data, B2 the tool path specified by a second block of machining data, and so on. $P_s(X_s, Z_s)$ and $P_e(X_e, Z_e)$ represent the starting point and end point, respectively, of the tool path specified by the second block, $P_b(X_b, Z_b)$ represents a tool breakage position, $P_t(X_t, Z_t)$ represents a tool change position, $P_{sh}(X_{sh}, Z_{sh})$ represents a tool retraction position, and $P_r(X_r, Z_r)$ represents a tool return position.

If a tool breaks at the point $P_b$ during a machining operation being executed under the control of the machining program, the operator, upon recognizing the abnormal condition represented by tool breakage, immediately depresses a button located on a control panel to send a tool breakage signal to the numerical control device, thereby informing the numerical control device of the fact that a tool has broken. An arrangement is also possible in which intervention by the operator is unnecessary. For example, tool breakage can be sensed by monitoring the armature current of the tool spindle motor or of the feed motor that transports the tool, the arrangement being such that the tool breakage signal is generated automatically when tool breakage is sensed in the above manner. The numerical control device, upon receiving the tool breakage signal, immediately interrupts the machining operation. The numerical control device is then placed under the control of a subprogram which is stored separately from the machining program, and executes the processing required to deal with the broken tool. Specifically, the subprogram may include instructions for executing the eight process steps shown below in order to deal with the broken tool. They are, with reference to FIG. 1A:

(1) compute the coordinates of the retraction position $P_{sh}$;
(2) move the broken tool to the retraction position $P_{sh}$;
(3) move the broken tool to the tool change position $P_t$;
(4) exchange the broken tool for a new tool;
(5) move the new tool to the retraction position $P_{sh}$;
(6) compute the coordinates of the position $P_r$ at which machining is to resume;
(7) move the new tool to the tool return position $P_r$; and
(8) resume machining in accordance with the tool breakage block.

Figure 1:
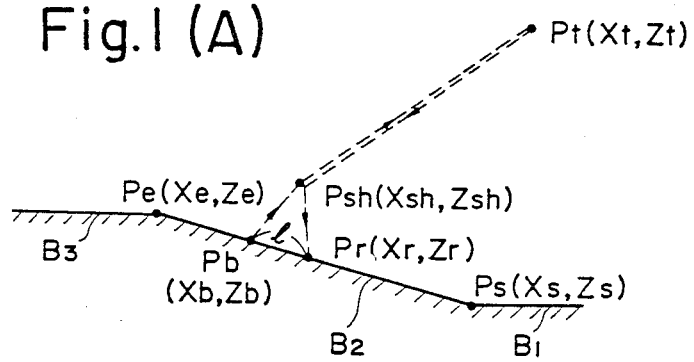
FIG. 1(A) is a diagram useful in describing the tool paths of a numerical control method according to the present invention.
FIG. 1(B) is a diagram used in describing the tool paths of another numerical control method according to the present invention.
FIG. 1(C) is a diagram used in describing the tool paths of another numerical control method according to the present invention.
FIG. 1(D) is a diagram used in describing the tool paths of another numerical control method according to the present invention.
Figure 1:
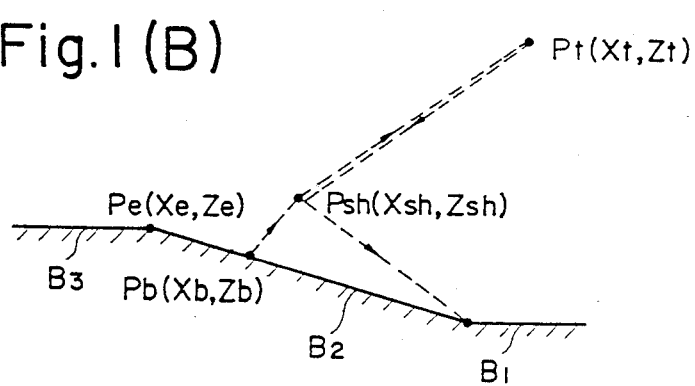
Figure 1:
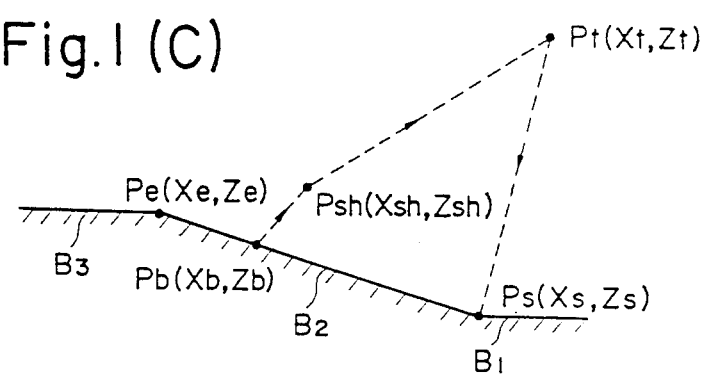
Figure 1D:
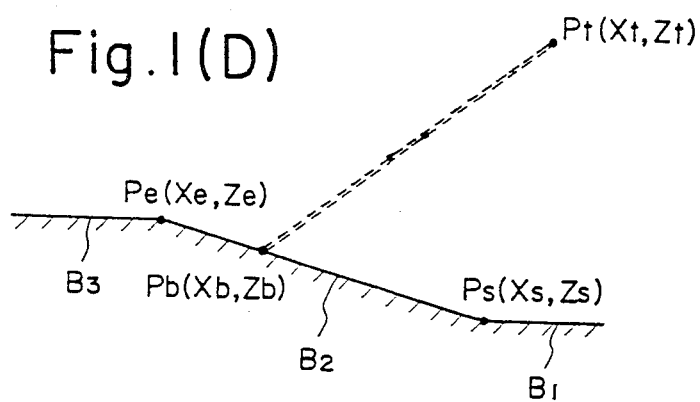
Figure 2:
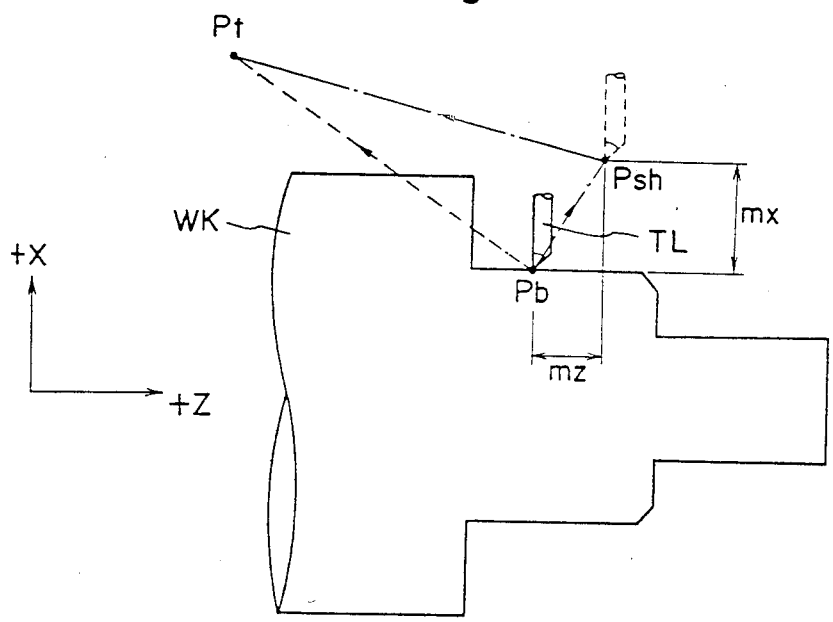
FIG. 2 is an illustrative view useful in describing tool retraction.

It should be noted that the broken tool is not moved directly to the tool change point $P_t$ in the illustration of FIG. 1A. The reason can be understood from FIG. 2, which shows that moving a tool TL to the point $P_t$ along the dashed line directly upon breakage may result in the tool striking the workpiece WK. It should also be noted, however, that a broken tool will not always strike the workpiece even if it is moved directly to the tool change position $P_t$ from any point on the tool path. This is shown in FIG. 1D, wherein it is seen that the broken tool may be moved directly from the point $P_b$ to the point $P_t$ without requiring that the tool first be retracted to the position $P_{sh}$. The direction in which a broken tool is to be retracted is decided by M-function instructions M81 through M83 included in the machining program. The instruction M81 means that an outer diameter cutting operation is in progress in the case of lathe machining or the like, M82 means that end face cutting is in progress, and M83 means that an inner diameter cutting operation is in progress, also in the case of lathe machining. If the tool breaks during outer diameter cutting, the tool is withdrawn to an exterior point, namely in the +X and +Z directions (as shown in FIG. 2). For breakage during inner diameter cutting, the tool is retracted to an interior point. If the tool breaks during an end face cutting operation, the tool is retracted to an external point which is directly opposite the chuck holding the workpiece. Thus, the instructions M81 through M83 are stored in memory and determine the direction of retraction. Also stored in memory are quantities that determine the retraction position, such as a retraction quantity m (which is equal to the distance from the point $P_b$ to the point $P_{sh}$), or the X-axis component $m_x$ and Z-axis component $m_z$ of the retraction quantity. Accordingly, when a reference point return instruction G28, which will be described later, is specified by the subprogram, the numerical control device performs the following computations to obtain the coordinates $(X_{sh}, Z_{sh})$ of the retraction position $P_{sh}$ (step 1):

$$X_{sh}=X_b+m_x, \quad Z_{sh}=Z_b+m_z \quad (A)$$

Next, the numerical control device responds to the reference point return instruction G28 to perform a pulse distribution operation with $m_x$, $m_z$ serving as incremental values, thereby to move the broken tool to the retraction position $P_{sh}$ (step 2). The tool change position $P_t$, namely a reference point having the coordinates $(X_t, Z_t)$, is stored in memory beforehand. When the broken tool reaches the retraction point $P_{sh}$, therefore, the numerical control device performs the computations $$X_t-X_{sh}=\Delta X, \quad Z_t-Z_{sh}=\Delta Z \quad (B)$$

to obtain incremental values $\Delta X$, $\Delta Y$, and then executes a pulse distribution operation on the basis of these incremental values to move the broken tool to the tool change position $P_t$ (step 3). When the broken tool has been exchanged for a new tool (step 4), the numerical control device performs the computations $$X_{sh}-X_t=\Delta X, \quad Z_{sh}-Z_t=\Delta Z \quad (C)$$

to obtain incremental values $\Delta X$, $\Delta Z$, and then executes a pulse distribution operation on the basis of these incremental values to move the new tool to the retraction position $P_{sh}$ (step 5). To position the new tool at the point $P_r$ and resume machining, the numerical control device finds the coordinates $(X_r, Z_r)$ of the point $P_r$, performs the computations $$X_r-X_{sh}=\Delta X, \quad Z_r-Z_{sh}=\Delta Z \quad (D)$$

to obtain the incremental values $\Delta X$, $\Delta Y$, and then executes a pulse distribution operation on the basis of these incremental values to move the new tool to the point $P_r$ (steps 6 and 7). The point $P_r$, at which machining is to resume, lies on the straight line connecting the points $P_s$, $P_e$, and its coordinates can be computed since it is a known distance l from the tool breakage position $P_b$. However, in a case where the new tool is to be returned to the starting point $P_s$ of the second block B2, as shown in FIGS. 1B and 1C, in order to permit machining to resume from that point, the coordinates of the point at which machining is to resume will coincide with the coordinates $(X_s, Z_s)$ of the starting point, so that step 6 can be omitted. Furthermore, if the paths shown in FIG. 1D are followed, the steps 1, 5 and 6 can be omitted.

The following is an example of a subprogram for a case in which tool movement follows the paths shown in FIG. 1B, (thus, as noted above, step 6 is omitted) wherein a broken tool is moved to the tool change position Pt and exchanged for a new tool, after which the new tool is positioned at the starting point $P_s$ of the second block B2 to resume the machining operation:

0 9001*
G28 U$m_x$ W$m_z$*
T$t_n$*
G29 XX$_s$ ZZ$_s$*
M99*

In the above, 0 9001 in the first block is a subprogram identification number, and G28 U . . . W . . . in the second block is an automatic reference point return instruction, in which retraction quantities $m_x$ (X-axis component) and $m_z$ (Z-axis component) are inserted after the letters of the alphabet U,W. Alternatively, the retraction quantities $m_x$ and $m_z$ can be obtained by using user-macro function, and thus do not need to be supplied in the subprogram. When the automatic reference point return command G28 U . . . W . . . * is read from memory, the numerical control device performs the computations of equation (A) to obtain the coordinates of the tool retraction point $P_{sh}$, and then performs an operation to rapidly move the broken tool to the retraction point. When the broken tool has been positioned at the point $P_{sh}$, the numerical control device performs the computations of equation (B) to obtain the incremental values ΔX, ΔZ required to move the tool change point Pt, and then executes a pulse distribution operation on the basis of these incremental values to rapidly position the broken tool at said point Pt. In the third block, Tt$_n$ is a tool function instruction (T function) for changing the broken tool to a new tool. The tool function is commanded by a 2 or 4 digit code following the address T. The relationship between the command T code and tool is specified by the machine tool builder.

In the fourth block, G29 XX$_s$ZZ$_s$ is an instruction for return to the position at which machining is to resume. In this instruction, (X$_s$, Z$_s$) are the coordinates of the starting point P$_s$ of the second block B$_2$. When the instruction G29 XX$_s$ ZZ$_s$* is read from memory, the numerical control device performs following computations $$X_{sh} - X_t = \Delta X$$

$$Z_{sh} - Z_t = \Delta Z$$

to obtain the incremental values ΔX, ΔZ required to move the new tool to the retraction position P$_{sh}$. Then, the new tool, in accordance with the incremental values ΔX, ΔZ, is rapidly positioned at the retraction point P$_{sh}$. After positioning the tool at the retraction point P$_{sh}$, the incremental values required to move the new tool the starting point P$_s$ of the second block B$_2$ are computed, then the new tool is positioned at the starting point P$_s$. In the fifth block, M99 is an M-function instruction (Miscellaneous function) which indicates the end of the subprogram.

Figure 3:
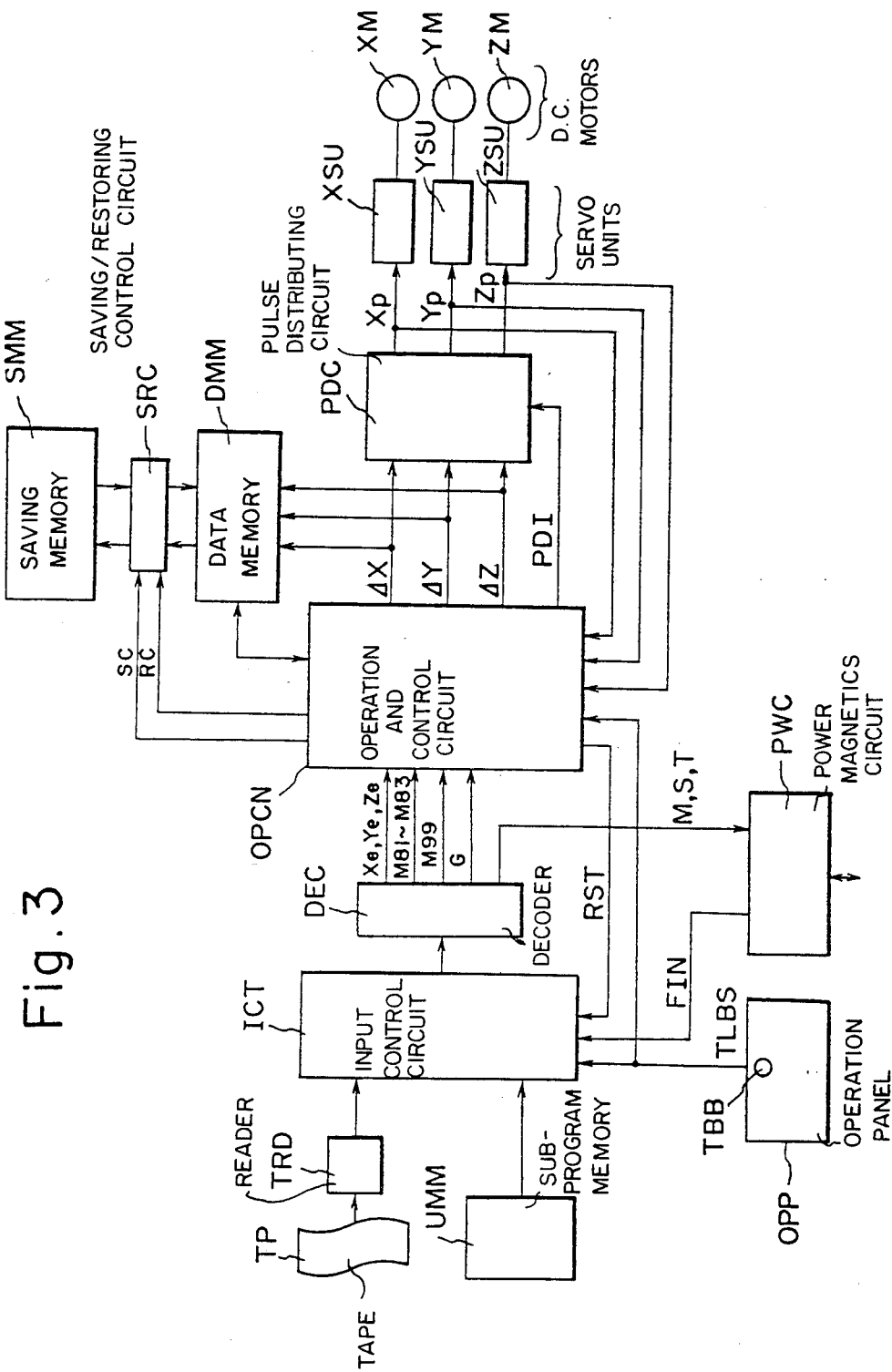
FIG. 3 is a circuit block diagram of a system embodying the present invention.

A block diagram of a system embodying the present invention is illustrated in FIG. 3. Reference character TP represents a numerical control (NC) tape bearing a punched NC program comprising NC data. The data on the NC tape is read by a tape reader TRD. A subprogram memory UMM stores a variety of subprograms that execute predetermined process steps to deal with various abnormalities that may occur, such as breakage of a tool. An input control circuit ICT ordinarily controls the tape reader TRD so as to sequentially read the NC data from the tape and deliver corresponding output signals to a decoder circuit DEC. When a signal indicative of an abnormality is generated, such as a tool breakage signal TLBS, however, the input control circuit ICT halts the reading of data from the NC tape TP and instead begins sequentially reading the subprogram, corresponding to the particular abnormality signal, from the subprogram memory UMM. The decoder circuit DEC decodes the NC data read out of the subprogram memory UMM. When the NC data indicates, for instance, a position instruction (X$_e$, Y$_e$, Z$_e$) or of a G-function instruction, the data is sent to an operation and control circuit OPCN. When the data indicates an M-, S- or T-function instruction, the data is sent to the machine tool through a power-magnetics circuit PWC comprising a sequence circuit. The operation and control circuit OPCN performs the operations X$_e$−X$_s$→ΔX, Y$_e$, −Y$_s$→ΔY, Z$_e$−Z$_s$→ΔZ when the inputs thereto are the absolute position commands X$_e$, Y$_e$, Z$_e$, thereby providing the incremental values ΔX, ΔY, ΔZ. These incremental values are delivered to a pulse distributing unit PDC which responds by generating distributed pulses X$_p$, Y$_p$, Z$_p$ for moving the tool along these axes. Whenever a distributed pulse is generated, the circuit OPCN increments or decrements, depending upon the direction of movement, the contents X$_a$, Y$_a$, Z$_a$ (initially X$_a$=X$_s$, Y$_a$=Y$_s$, Z$_z$=Z$_s$) of a current position storage area, and subtracts 1 from the contents X$_m$, Y$_m$, Z$_m$ in a storage area that stores the amount of tool movement remaining. In addition, the circuit OPCN executes various control operations in accordance with G-function instructions. A data memory DMM stores the retraction quantities m$_x$, m$_z$ (X- and Z-axis components), the current position coordinates X$_a$, Y$_a$, Z$_a$, the starting point coordinates X$_s$, Y$_s$, Z$_s$, the end point coordinates X$_e$, Y$_e$, Z$_e$, the incremental values ΔX, ΔY, ΔZ for the remaining amount of tool movement, and the instructions M81 through M83, as well as the G-function instructions and an interpolation mode. Reference character XSU, YSU and ZSU denote well-known servo units for the X, Y and Z axis, respectively, and XM, YM, ZM denote DC motors for movement along the X, Y and Z axes, respectively. A saving memory SMM stores the content of the data memory DMM when an abnormality occurs, such as tool breakage. A saving/restoration control circuit SRC responds to the occurrence of an abnormality by taking the data in the data memory DMM and storing it in the saving memory SMM. When processing in accordance with the subprogram is completed, the circuit SRC takes the data stored in the saving memory SMM and restores the data by returning it to the data memory DMM. The power-magnetics control circuit PWC administers the exchange of data between the machine tool and the numerical control device. OPP denotes an operation panel.

The present invention operates in the following manner. When conditions are normal, the input control circuit ICT controls the tape reader TRD so as to read the NC data from the NC tape TP sequentially block-by-block. The NC data is delivered to the operation and control circuit OPCN which responds by executing numerical control processing in order to subject a workpiece to a predetermined machining operation. More specifically, when the instructions read from the NC tape TP are instructions for absolute positioning or movement instructions (X$_e$, Y$_e$, Z$_e$), the instructions are converted into commands by the decoder circuit DEC and applied to the operation and control circuit OPCN. When the inputs to the latter are X$_e$, Y$_e$, Z$_e$, the following operations are performed (where X$_a$, Y$_a$, Z$_a$ indicate the current position):

$$X_e - X_s = \Delta X, \text{ where } X_s = X_a$$

$$Y_e - Y_s = \Delta Y, \text{ where } Y_s = Y_a$$

$$Z_e - Z_s = \Delta Z, \text{ where } Z_s = Z_a$$

thereby to derive the indicated incremental values. The results of these operations (namely the incremental values ΔX, ΔY, ΔZ) are applied to the pulse distributor PDC. These incremental values, together with the starting point coordinates X$_s$, Y$_s$, Z$_s$ and the instructed end point coordinates X$_e$, Y$_e$, Z$_e$, are stored in the memory DMM. In addition, the incremental values are set in the storage area located within the memory DMM for storing the values of remaining movement (X$_m$=ΔX, Y$_m$=ΔY, Z$_m$=ΔZ).

The pulse distributor PDC executes a pulse distribution operation immediately upon receiving the incremental values ΔX, ΔY, ΔZ. The resulting distributed pulses X$_p$, Y$_p$, Z$_p$ are applied to the servo units XSU, YSU, ZSU to drive the respective DC motors XM, YM, ZM to move the tool along the programmed path. The pulses $X_p$, $Y_p$, $Z_p$ are simultaneously delivered to the operation and control circuit OPCN, which is operable to perform the operations $$X_m - 1 \rightarrow X_m, Y_m - 1 \rightarrow Y_m, Z_m - 1 \rightarrow Z_m \text{ and}$$

$$X_a \pm 1 \rightarrow X_a, Y_a \pm 1 \rightarrow Y_a, Z_a \pm 1 \rightarrow Z_a$$

thereby to update the current position $(X_a, Y_a, Z_a)$ storage area and the remaining movement $(X_m, Y_m, Z_m)$ storage area. The sign (+ or −) in the latter set of computations will depend upon the direction of tool movement. When the condition $X_m = 0$, $Y_m = 0$, $Z_m = 0$ is attained, the operation and control circuit OPCN sends a pulse distribution stop signal PDI (at logical "1") to the pulse distributor PDC, and generates an NC data read signal RST which is applied to the input control circuit ICT. The ITC responds by reading the next block of NC data through the tape reader TRD.

When the machining data read from the NC tape is an M-, S- or T-function instruction, the input control circuit ICT delivers the instruction to the machine tool through the power-magnetics circuit PWC. When the machine tool completes a machining operation in accordance with the delivered instruction, the power-magnetics control circuit PWC issues a signal FIN indicative of this fact, the signal being delivered to the input control circuit ICT to effect the readout of the next block of machining data. The G-function instructions M81 through M83, it should be noted, are stored in the data memory DMM.

If an event such as tool breakage occurs during a machining operation performed in the above-described manner, the operator, in accordance with the present embodiment, depresses a tool breakage button TBB located on the operation panel OPP, sending a tool breakage signal TLBS to the input control circuit ICT and to the operation and control circuit OPCN. As a result, the circuit OPCN sends the pulse distribution stop signal PDI to the pulse distributor PDC, and sends a save command SC to the saving restoration control circuit SRC which responds by taking the data in data memory DMM and saving it in the saving SMM. Meanwhile, the input control circuit ICT immediately selects, from the subprogram memory UMM, the appropriate subprogram for dealing with the broken tool. The instructions of the subprogram are read out of the subprogram memory in a block-by-block manner, converted into commands by the decoder circuit DEC and then delivered to the operation and control circuit OPCN. The OPCN circuit computes the coordinates $(X_{sh}, Y_{sh}, Z_{sh})$ of the tool retraction point $P_{sh}$, and supplies the pulse distributor PDC with the incremental values $\Delta X$, $\Delta Y$, $\Delta Z$, namely the X, Y and Z-axis components $(X_{sh} - X_b)$, $(Y_{sh} - Y_b)$, $(Z_{sh} - Z_b)$ of the amount of tool retraction, these being equal to $m_x$, $m_y$, $m_z$, respectively. The coordinates $(X_{sh}, Y_{sh}, Z_{sh})$ are stored in the predetermined areas of the data memory. The pulse distributor PDC begins the pulse distribution operation when the pulse distribution stop signal is removed (i.e., when PDI goes to logical "0"), the other inputs to the pulse distributor being $m_x$, $m_y$ and $m_z$. When the pulse distributor PDC has produced the pulses $X_p$, $Y_p$, $Z_p$ which correspond in number to the values indicated by $m_x$, $m_y$ and $m_z$, the operation and control circuit OPCN issues the pulse distribution end signal PDI (logical "1") to terminate the pulse distribution operation. At such time retraction of the broken tool to the retraction position $P_{sh}$ is complete. Thereafter, in accordance with the instructions in the subprogram, the numerical control device positions the broken tool at the tool change point $P_t$, changes the tool, positions the new tool at the tool retraction point $P_{sh}$, computes the coordinates of the position where machining is to be resumed, and then moves the new tool to this position, so that the new tool is finally positioned at the starting point $P_s$ where machining is to be resumed. Next, the M-function instruction M99, indicating the end of the subprogram, is read from the program and delivered to the operation and control circuit OPCN. The latter responds by sending the restoration command RC to the saving/restoration control circuit SRC which in turn responds by returning to the data memory DMM the incremental values $\Delta X$, $\Delta Y$, $\Delta Z$ preserved in the saving SMM. These incremental values are applied to the pulse distributor circuit PDC which now produces pulses that move the new tool to the tool breakage position $P_b$ along the programmed path $P_s P_b$ where machining was performed prior to tool breakage. When this point is reached, the content (current tool position) of the current position storage area coincides with the tool breakage position. Accordingly, the quantities for remaining tool movement $(X_m, Y_m, Z_m)$ and the current position coordinates $(X_a, Y_a, Z_a)$, which were preserved in the saving memory at the time of tool breakage, are returned to the data memory DMM, allowing machining of the workpiece to be continued on the basis of such data.

The present invention is not limited to the preferred embodiment as described above and as illustrated in the drawings, and can be modified in various ways. For example, abnormalities other than tool breakage can be dealt with through proper modifications. Further, rather than having the operator depress a button to generate the tool breakage signal, a sensor can be provided and adapted to generate the signal. Various subprograms also may be provided and stored in the subprogram memory beforehand, with the arrangement being such that a subprogram prescribed for a particular abnormal condition is read out as required. The tool retraction position can be determined on the basis of the shape of the workpiece or on the basis of the shape into which the workpiece is to be machined.

In accordance with the present invention as described above, the machining program and the subprogram are stored beforehand in a storage medium, and the subprogram is read out from the storage medium in response to an event such as breakage of a tool during machining under the machining program. Thus the abnormal condition can be dealt with by executing processing automatically under the control of the subprogram. This enables the abnormality to be dealt with in a shorter period of time, simplifies the operator's task, and greatly enhances machining efficiency. For a numerical control device which is built in a computer, merely the addition of a small quantity of interface circuitry permits the invention to be practiced without an increase in hardware.

As many apparently widely different embodiments of this invention may be made without departing from the spirit and scope thereof, it is to be understood that the invention is not limited to the specific embodiments thereof except as defined in the appended claims.

What we claim is:

1. A method for controlling a machine tool operatively connected to a numerical control device and having an internal state, a memory for storing a machine program and a subprogram associated with a specific abnormality of the machine tool, the memory being operatively connected to receive a specified signal corresponding to said specific abnormality, said method comprising the steps of:
   (a) storing the subprogram associated with the specific abnormality in the memory;
   (b) storing the machine program in the memory;
   (c) executing the machine program;
   (d) receiving the specified signal in response to the abnormality occurring;
   (e) halting the execution of the machine program;
   (f) storing the internal state of the numerical control device in the memory;
   (g) executing the subprogram associated with the specific abnormality to automatically change the tool, the subprogram comprising the steps of:
      (1) moving the tool from the workpiece in accordance with the machining being performed to a tool changing position;
      (2) changing the tool;
      (3) moving the tool from the tool changing position to the workpiece;
   (h) replacing the internal state of the numerical control device with the internal state stored in the memory; and
   (i) resuming execution of the machine program.

2. A numerical control device for controlling a machine tool, having an internal state and being connected to receive abnormal event signals and machining programs, comprising:
   a subprogram memory for storing machining programs for use in automatically replacing the machine tool in response to a corresponding one of the abnormal event signals;
   an input/output control means, operatively connected to receive the abnormal event signals and operatively connected to the machine tool and said subprogram memory, for receiving one of the abnormal event signals and initiating execution of one of the machining programs in accordance with the received one of the abnormal event signals, and for providing said one of the machining programs;
   decoding means, operatively connected to said input/output control means, for decoding said one of the machining programs and for providing decoded signals responsive to said one of the machining programs;
   memory means, operatively connected to said decoding means, for storing said one of said machining programs, and for storing said internal state of said numerical control device in response to the received one of the abnormal event signals;
   control means, operatively connected between said decoding means and said memory means, said input/output control means and the machine tool, for automatically moving the machine tool in accordance with said decoded signals and for providing control signals for initiating the storage and retrieval of said internal state in response to the abnormal event signals.

3. A numerical control device according to claim 2, wherein said memory means comprises:

a data memory, operatively connected to said control means, for storing said respective ones of said machining programs;
   a save memory, operatively connected to said data memory, for storing said internal state of said numerical control device in response to said control signals;
   transfer means, operatively connected to said control means and between said data memory and said save memory, for transferring said internal state between said save memory and said data memory in response to said control signals.

4. A numerical control device according to claim 2, wherein said control means comprises:
   a control means, operatively connected to said memory means, to said input/output control means and operatively connected to receive said decoded signals, for generating said control signals in accordance with selected ones of said decoded signals;
   pulse distribution means, operatively connected to said control means and to said memory means, for moving the machine tool in accordance with selected ones of said decoded signals.

5. A method of numerically controlling a machine tool by a numerical control device operatively connected to receive a specific signal, operatively connected to a sensor which senses abnormalities in the numerical control device and having a memory for storing a machining program and a subprogram, the numerical control device machining a workpiece in accordance with a predetermined machining operation defined by the machining program, said method comprising the steps of:
   (a) storing, in the memory, the subprogram which the numerical control device executes in response to receiving the specified signal generated during numerically controlled machining under the control of the machining program;
   (b) generating the specified signal in response to an abnormality in the numerical control device and in the machine tool due to breakage of the machine tool;
   (c) stopping the numerically controlled machining and preserving the internal state of the numerical control device in the memory in response to the generation of the specified signal;
   (d) executing the subprogram to automatically change the machine tool by means of the numerical control device, the subprogram comprising the substeps of:
      (i) computing the coordinates of the position to which the machine tool is to be retracted from the workpiece, in accordance with the numerically controlled machining being performed;
      (ii) moving the machine tool to the computed retracted position;
      (iii) moving the machine tool to the tool change position;
      (iv) exchanging the machine tool for a new machine tool;
      (v) moving the new machine tool to the computed retracted position; and
      (vi) moving the new machine tool to the tool return position;
   (e) restoring the internal state of the numerical control device, preserved in the memory, following the execution of the subprogram; and (f) resuming the numerically controlled machining operation, under the control of the machining program, on the basis of the restored internal state of the numerical control device.

6. A method of numerical control according to claim 5, wherein said step (b) comprises generating the specified signal in accordance with the sensor which senses the abnormality in the numerical control device.

7. A method of numerical control according to claim 5, wherein said step (b) comprises manually generating the specified signal by an external operator.

8. A method of numerical control according to claim 5, wherein said step (d) further comprises, after said substep (v), the substep of computing the coordinates of the position at which the machining is to be resumed.

9. A method of numerical control according to claim 5, wherein said substep (i) comprises the step of adding the present position coordinates of the machine tool to a retraction quantity which is stored in the memory to obtain the retracted position.

10. A method of numerical control according to claim 5, wherein said substep (vi) comprises the steps of:
 (aa) computing incremental values in dependence upon the retracted position; and
 (bb) adding the incremental values to the retracted position to determine the coordinates of the tool return position.

* * * * *